June 22, 1954  J. A. T. ELLISON  2,681,960
CONTROL DEVICE FOR PARKING METERS
Filed Nov. 29, 1949                               2 Sheets-Sheet 1
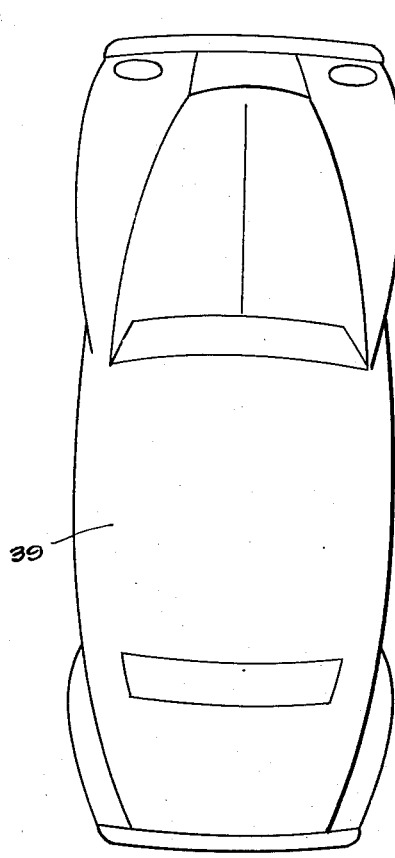
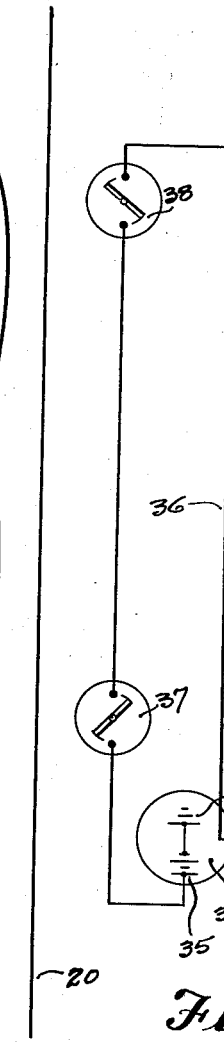
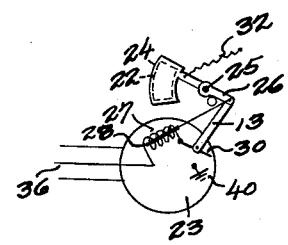
Fig. 10.
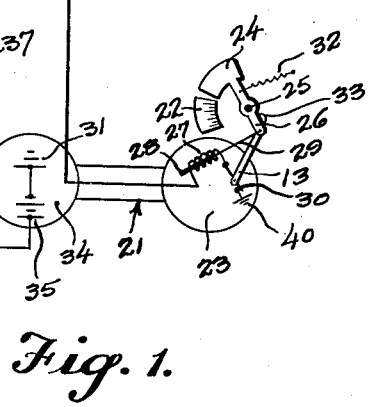
Fig. 11.
Fig. 1.
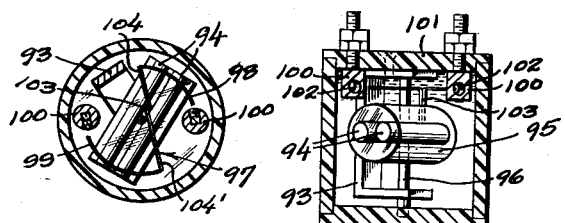
Fig. 8.  Fig. 9.
INVENTOR.
JOHN A. T. ELLISON
BY
ATTORNEY June 22, 1954  J. A. T. ELLISON  2,681,960
CONTROL DEVICE FOR PARKING METERS
Filed Nov. 29, 1949  2 Sheets—Sheet 2

INVENTOR.
JOHN A. T. ELLISON.
BY
ATTORNEY

Patented June 22, 1954

2,681,960

UNITED STATES PATENT OFFICE 2,681,960

CONTROL DEVICE FOR PARKING METERS

John A. T. Ellison, Seattle, Wash.

Application November 29, 1949, Serial No. 130,046

2 Claims. (Cl. 200—87)

This invention relates to a parking meter control for automatically nullifying any residue of time remaining on the meter when an automobile parked in a parking zone related thereto is driven from the zone. A principal part of said control system is a normally closed switch unit activated and opened by the magnetic attraction of an adjacent parked automobile.

An object of my invention is to provide a control system that can be utilized with a variety of different parking meters without necessitating material alterations of the latter.

A further object of my invention is to provide a control system including electrically actuated means requiring only a minute amount of electrical energy to nullify the time reading of a parking meter and which causes the electric circuit to be automatically deenergized when the nullifying action is accomplished.

Another object of my invention is to furnish a parking meter control system which is not readily subject to tampering by pranksters, and which will also preclude the inadvertent closing of the circuit of the control system in a situation where, say, a magnet-effecting metal body such as a tool box is set down adjacent the zone in which a car has been parked.

My invention also has as an object the providing of a magnetic switch unit for use in my parking meter control system which unit is dependable in operation, is not subject to oxidation, does not arc at the poles, is effectively dampened, is of simple and economic construction, and can be easily and expeditiously installed.

With the above and other still more particular objects and advantages in view and which, with the foregoing, will appear and be understood in the course of the following description and claims, the invention consists in the novel construction and in the adaptation and combination of parts hereinafter described and claimed.

In the drawings:

Figure 1 is a schematic plan view of my control system showing an automobile in the related parking zone and with the meter dial covered by a flag nullifier.

Figs. 8 and 9 illustrate a further modification with the former view being a horizontal section and the latter view a vertical section of Fig. 8.

Fig. 10 is a schematic plan view illustrating close-coupled switches in series for a purpose hereinafter to be described; and Fig. 11 is a fragmentary schematic plan view which is to be read in conjunction with Fig. 1 to indicate the two positions of the nullifying flag.

Figure 2:
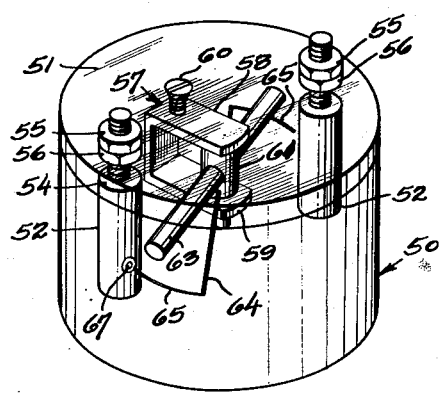
Fig. 2 is a perspective view of one embodiment of my magnetic switch unit shown in an open position.

My control system is particularly adapted to be used in conjunction with a conventional or suitable coin operated type of parking meter such, for example, as one in which a clock-driven hand is moved along the face of a dial marked from 0 to 60. The insertion of a coin moves the hand to the 60 end of the dial and the clock then moves the hand toward the zero end with the passage of time, the position of the hand indicating on the dial the minutes of legal parking time remaining. The principal function of my control system is to provide a mechanism which will automatically block off the dial or otherwise effectuate a nullifying function upon the dial when a parked car is driven from the related parking zone with time still remaining upon the dial, thus to preclude such remaining time being used by another car moving into the parking zone.

As the nullifying agent, I have elected to show a flag 24 whose staff 26 is pivotally mounted at 25 in the head 23 of the meter. Also housed in the head 23 are a knife-switch 30 and a solenoid 27 having a core 28. An arm 29 is provided as an extension of the core 28 and has its other end pivotally connected to the base of the staff 26. The free end of the knife or blade of the switch is operatively interconnected with the base of the staff 26 by means of a link 13. In Fig. 1 the dial 22 is shown exposed with the switch 30 closed and the solenoid 27 in an inactivated state. It can be readily seen that if the solenoid 27 is energized so that the core 28 is drawn into the solenoid coils, the arm 29 will be forced away from the solenoid causing the flag 24 to move counter-clockwise into a nullifying position over the dial 22 and also causing the link 13 to open the switch 30, all as illlustrated in Fig. 11. Yieldingly opposing the counter-clockwise movement of the flag 24 is a tension spring 32 connected at one end to the staff 26 and having its other end anchored to the meter head 23. Hence when the flag 24 is moved from the Fig. 1 to the Fig. 11 position the spring 32 is tensioned and, upon inaction of the solenoid 27, would act to return the flag back to the Fig. 1 position were it not for a catch 33 which is caused to normally lodge itself as a stop arm behind the flag staff 26 and which is so associated with the coin chute as to be momentarily depressed into a staff-releasing position by passage of an inserted coin along the coin chute. This perforce allows the spring 32 to assert itself and swing the flag 24 clear of the dial 22 into the Fig. 1 position. The staff when it occupies its spring-retracted position, may itself act to hold the latch depressed by overlying the same.

In series with the solenoid 27 and switch 30 in an electric circuit 36 are batteries 35, desirably dry-cell, preferably housed in the meter base 34, and also connected in series in this circuit are magnetic switches 37 and 38 of the type hereinafter set forth. These switches are embedded adjacent the curb 29 of a parking zone shown in Fig. 1 as being occupied by a car 39. The circuit 36 is grounded at 40 and 31. At this point clarity in an understanding of the invention will perhaps be advanced by stating that at least one of the switches 37 and 38 will be opened by the attraction of the car 39 when it is parked in the related zone and thus the circuit 36 will always be open when a car is parked. After the car enters the parking zone but before a coin is inserted the flag will be in the Fig. 11 position nullifying the dial 22. The interjection of a coin into the meter depresses the catch 33 to free the staff 26 so that the tensioned spring 32 is enabled to swing the flag 24 to the Fig. 1 position wherein the meter is exposed and the switch 30 is simultaneously closed. When the car is driven from the zone the magnetic switches 37 and 38 take normal positions reflecting the influence of the earth's magnetic pull, positions which, more especially, close the switches to complete a circuit from the batteries 35 through the solenoid 27 inasmuch as the switch 30 is also closed. The resultant energizing of the solenoid 27, as above explained, causes the switch 30 to be opened to break the circuit 36, which prevents a drain on the batteries 35. The catch 33 is now automatically lodged behind the staff 26, causing the dial to be concealed, and remain concealed, until another coin is inserted in the meter.

Figure 3:
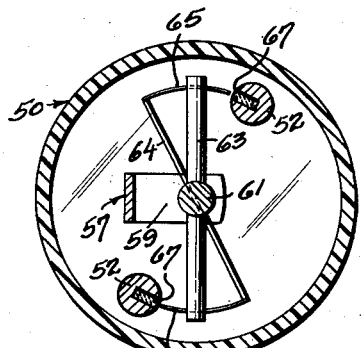
Fig. 3 is a horizontal sectional view of the embodiment portrayed in Fig. 2.

Referring first to the embodiment of my magnetic switch unit shown in Figs. 2 and 3, the said unit is preferably housed in a cylindrical container 50 having a bottom wall formed integral with the side wall and is sealed by a lid 51 which is bonded to the top of the side wall after the unit is assembled. The container 50 may be formed of plastic or other suitable material not susceptible to magnetic attraction. Suspended from the lid 51 are two spaced identical poles 52 formed of copper or other electrically conductive material. Such poles are necked down at the upper end so to form abutment shoulders 54, and have the necks threaded. The lid 51 has tapped openings for threadably receiving the neck portions and when received the necks protrude slightly above the lid and are fitted with nuts 55 and 56. When the unit is installed for use, conventional wire leads are secured between these nuts.

Suspended from the lid by a flat headed screw 60, to lie within the housing is a U-shaped yoke 57 having its two arms 58 and 59 disposed horizontally in vertical spaced relation, and a post 61 of brass or other suitable non-magnetic material is mounted between the yoke arms for pivotal action about its longitudinal center as an axis. The mounting is effected in any manner calculated to minimize friction. A permanent bar magnet 63 traverses the post 61 with its two ends projecting equidistantly from opposite sides of the post, and also traversng the post is a length of fairly heavy-gauge copper wire 64 lying in a vertical plane forming an acute angle with the vertical plane occupied by the magnet 63, the wire, as can be best seen in Fig. 3, being of a length approximating the distance between the longitudinal axes of the poles 53. Secured to the ends of the wire, as by solder, and extending in opposite directions are respective light-gauge conductive wire fingers 65 each bent to coincide with the curvature of a circle of which the spanning wire 64 is a diameter. The length of the wire fingers is in each instance sufficient to project the free end thereof beyond the related end of the magnet.

The poles 52 are each provided with a cylindrical pocket 67 whose axis coincides with the circle on which the wire fingers lie. These pockets 67 are filled with mercury, adhering by surface tension to the walls thereof, and will be hereinafter termed mercury pots. The mercury pots 67 are of sufficient length and are so positioned that the extreme ends of the wire fingers will be caused to embed themselves within the mercury when the magnet 63 is swung clockwise from the Fig. 3 position to one in which the magnet abuts the poles 52. When the magnet engages the poles 52 the wires 64 and 65 are, however, freely suspended within the mercury, and which is to say that they are not in contact with the floor wall of the respective pot, wherefor liability of the fine wires being bent is thus precluded.

Figure 4:
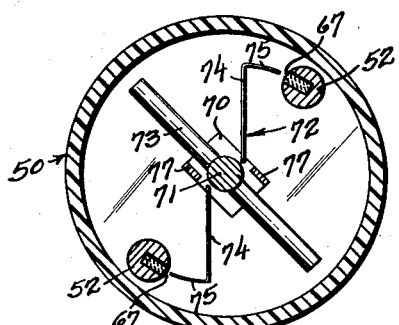
Fig. 4 is a horizontal sectional view of another modification of my magnetic switch unit.

In the Fig. 4 embodiment of my invention two plates 70, one of which is not shown, are screwed or otherwise secured to the floor and lid, respectively, of the container 50. A post 71 is pivotally mounted between the plates 70, and a bar magnet 73 traverses the post. Lengths of spring copper wire 72 made generally to an L shape, are anchored by one leg of each to the bottom plate to have the other leg 74 project horizontally from diametrically opposite sides in a plane common to that occupied by the bar magnet. On the free ends and extending approximately at right angles to the parent branch 74 are terminal fingers 75, these fingers being oppositely directed. As with the embodiment above described, the fingers lie on the circumference of a circle taken about the post as a center and passing through the axes of the aforementioned mercury pots 67. The anchored ends of the wires are perforce conductively connected. It may be seen that as the magnet 73 swings clockwise from the position shown in Fig. 4 it will engage the wire branches 74 and force the fingers 75 into the mercury pots, this movement being yieldably resisted by the torsional twist to which the spring wires are subjected. The lower plate 70 is provided with vertical ears 77 to limit the counter-clockwise rotation of the magnet 73.

Figure 5:
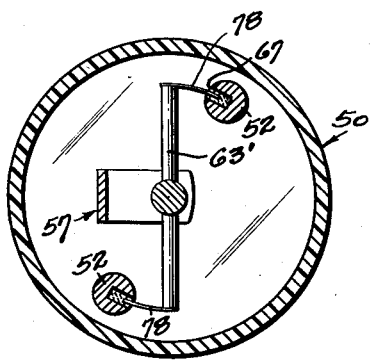
Fig. 5 is a horizontal sectional view showing still another modification of the magnetic switch, the switch being in this instance illustrated in a closed position.

Another embodiment of my invention is shown in Fig. 5 and is identical to that illustrated by Figs. 2 and 3 except that in lieu of the finger extremities 65 and 75, respectively, the counterparts 78 thereof are secured directly to the ends of the bar magnet 63 in any suitable manner so that the magnet becomes part of the said circuit.

Figure 6:
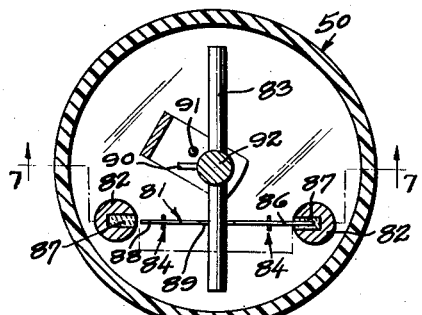
Fig. 6 is a horizontal sectional view of yet another modification of the magnetic switch unit, portrayed in open position.
Figure 7:
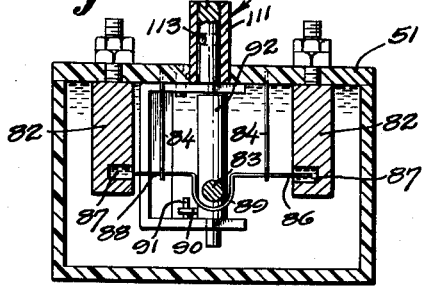
Fig. 7 is a vertical sectional view on line 7—7 of Fig. 6.

In Figs. 6 and 7 another species of my invention is disclosed wherein the magnet 83 is suspended for rotation in the same manner as shown in Fig. 2. The two poles, here designated by 82, are spaced apart at equal distances from and out of alignment with the center of the magnet 83 and are equipped with mercury pots 87 lying in alignment in a plane slightly above the magnet 83 and with their mouths opposingly placed. Suspended from the lid 51 and lying between the poles 82 are two spaced hanger wires 84 having eyes at their lower ends in alignment with the mercury pots. A copper wire 81 with straight end portions 86 and 88 and with a center yoke section 89 has its said end portions slidably received in the eyes 85 with the yoke 89 straddling the magnet 83. The end portion 86 is longer than the portion 88 and extends a substantial distance within its mercury pot when the magnet 83 lies directly between the poles 82 as shown in Figs. 6 and 7, the other end 88, in this said position of the magnet, being slightly withdrawn from the other mercury pot. Thus it can be seen that when the magnet 83 swings clockwise it will engage the yoke 89 and urge the end portion 88 into its mercury pot. The other end portion 86 will, of course, be partially withdrawn from its mercury pot, but there is provided a small horizontal pin 90 protruding from the post 92 arranged to engage an upstanding stop 91 on the lower arm of the yoke to limit the clockwise rotation of the magnet 83 and hold the same within travel limits insufficient to fully withdraw the end portion 86 from its mercury pot. Therefore, it can be seen that a clockwise swing of the magnet 83 as shown in Figs. 6 and 7 will complete a circuit between the poles via the wire 81 and a minor degree of return travel will suffice to break this circuit.

In another and unusually compact embodiment of my invention shown in Figs. 8 and 9 two permanent bar magnets 94 are embedded in a horizontally disposed plastic cylinder 95. A vertical post 96 is passed centrally through the cylinder 95 between the magnets 94 and is pivotally mounted between the arms of a yoke 93 in a manner like or similar to that explained. Two short poles 100 are suspended from the lid 101 and have mercury pots 102 therein. A copper wire 97 has a displaced upright portion 103 embedded in the cylinder 95 adjacent the rod 96 from which two horizontal portions 104 and 104' extend, the ends of which intercept and support arcuate wires 98 and 99 arranged for insertion into the mercury pots 102 when the magnets are rotated clockwise, such rotation being limited by the engagement of the cylinder 95 with the poles, and in this regard it will be seen in Fig. 8 that the tips of the wires 98 and 99 extend slightly beyond the cylinder 95 to permit such insertion thereof.

It will be noted that in my control circuit 36 the magnetic switches 37 and 38 should be closed when not attracted by a parked automobile. Therefore the poles of my switch are normally placed in a north-south direction wherein the bar magnet will take a position abutting the poles and closing the switch. Hence on an east-west street it is necessary to provide a compensator such as 110 in Fig. 7, preferably aligned with the vertical axis of the container 50. A simple form of compensator comprises a hollow plastic plug 111 in the lid 51 having a brass rod 112 inserted therein which has a small bar magnet 113 extending transversely therethrough. The compensating magnet 113 will, of course, attract the primary magnet, so that it can be rotated in the hollow plug 111 to a location wherein the normal position of the primary bar magnet will be such as to close the switch. Preferably the container 50 is filled with kerosene or some other liquid of similar viscosity which will prevent oxidation of the switch parts and will properly dampen the movement of the bar magnet. Some space must be left in the container to allow for expansion of the liquid.

It has been determined that the rear end of automobiles has a negative polarity. By far the majority of cars have front ends with a positive polarity but there are a considerable number of cars which are found to have a negative polarity at both front and rear ends. Hence when the axis of the parking zone is parallel to the curb as in Figure 1, a magnetic switch 37 placed adjacent the rear end of said parking zone and which is arranged to open when its north pole is repelled will always be open when a car is parked. In Fig. 1, I have also shown a second magnetic switch 38 placed near the front end of the parking zone and adapted to be opened by attraction of its north pole. Such switch 38 will therefore also be open a majority of the times that the parking zone is occupied. I recognize that a prankster might attempt to nullify the parking meter of an occupied parking zone by using a magnet to counter the car's attraction. By the use of two magnetic switches it will be seen that, excepting for the rare cases in which both ends of a parked car evidence a like polarity, it becomes impossible for a single magnet to close the two widely spaced magnetic switches at one and the same time. Also an article such as a tool box accidently placed near one of the switches could not close both of them.

In Fig. 10 I have illustrated an arrangement of two magnetic switches 137 and 138 for use in so-called parallel parking instances wherein the longitudinal median line of the parking zone is at an angle to the curb. As mentioned above, the polarity of the front end of a car might be either negative or positive wherefor two oppositely acting magnetic switches are required to assure that at least one of these switches will open irrespective of the car's front-end polarity. Of the two switches which I show, one is adapted to be opened by attraction of the north pole and the other by repulsion thereof. The two close-coupled switches could, if desired, be substituted for the single switch 37 at the rear end of the type of parking zone illustrated in Fig. 1, thus assuring, under any condition of changing rear-end polarity, an opening of the circuit when a car is parked in such zone.

In Figs. 1 and 10 I have shown my magnetic switches embedded in the curb but such is not intended as a limitation because the switches would operate equally as well if placed in the street proper.

The advantages of the invention will, it is thought, have been clearly understood from the foregoing detailed description of the embodiments which I have elected to illustrate. Minor changes in the details of construction will suggest themselves and may be resorted to without departing from the spirit of the invention, wherefor it is my intention that no limitations be implied and that the hereto annexed claims be given a scope fully commensurate with the broadest interpretation to which the employed language admits.

What I claim is:

1. A magnetic switch unit comprising a closed liquid-tight housing having a nonconductive top plate, a magnet assembly suspended from the top plate and including a bar magnet mounted for pivotal movement about a vertical axis, a pair of spaced vertical conductive posts passing through and suspended from said top plate and each providing a binding terminal outside of the housing and a mercury pot inside of the housing, means within the housing and operatively associated with the magnet for completing a conductive connection between the said mercury pots during a selected range of the pivotal travel of the magnet, and a nonconductive liquid filling the housing above the magnet for dampening the movement of the latter.

2. A magnetic switch unit comprising a closed liquid-tight housing, a bar magnet pivotally mounted in said housing for pivotal movement about an axis perpendicular to the longitudinal axis of the magnet, a nonconductive liquid filling the housing above the magnet for dampening the movement of the latter, a pair of spaced conductive posts passing through an outer wall of the housing and each providing a binding terminal outside of the housing and a mercury pot inside the housing, and means operatively associated with the magnet for completing a conductive connection between the said mercury pots during a selected range of the pivotal travel of the magnet.

References Cited in the file of this patent

UNITED STATES PATENTS

| Number | Name | Date |
|---|---|---|
| 685,430 | Pearson | Oct. 29, 1901 |
| 980,155 | Hertzberg | Dec. 27, 1910 |
| 1,289,637 | Bruce, Jr. | Dec. 31, 1918 |
| 1,975,762 | Behmer | Oct. 9, 1934 |
| 1,992,214 | Katz | Feb. 26, 1935 |
| 2,068,121 | Babson | Jan. 19, 1937 |
| 2,121,179 | Sweetland | June 21, 1938 |
| 2,240,891 | Marchant | May 6, 1941 |
| 2,255,187 | Reasoner | Sept. 9, 1941 |
| 2,323,910 | Hubbel | July 13, 1943 |
| 2,489,113 | Veenstra | Nov. 22, 1949 |
| 2,520,525 | Brouse | Aug. 29, 1950 |

FOREIGN PATENTS

| Number | Country | Date |
|---|---|---|
| 119,086 | Great Britain | Sept. 19, 1918 |
| 170,117 | Great Britain | Oct. 17, 1921 |